(12) United States Patent
Baston et al.

(10) Patent No.: US 12,385,816 B2
(45) Date of Patent: Aug. 12, 2025

(54) DIFFERENTIAL DISPENSING METHOD

(71) Applicant: BIT GROUP FRANCE, Montpellier (FR)

(72) Inventors: Florent Baston, Chabris (FR); Maxime Leveau, Fabrègues (FR)

(73) Assignee: BIT GROUP FRANCE, Montpellier (FR)

( * ) Notice: Subject to any disclaimer, the term of this patent is extended or adjusted under 35 U.S.C. 154(b) by 752 days.

(21) Appl. No.: 17/597,505

(22) PCT Filed: Jul. 26, 2019

(86) PCT No.: PCT/IB2019/000795
§ 371 (c)(1),
(2) Date: Jan. 7, 2022

(87) PCT Pub. No.: WO2021/019267
PCT Pub. Date: Feb. 4, 2021

(65) Prior Publication Data
US 2022/0364963 A1    Nov. 17, 2022

(51) Int. Cl.
*G01N 1/38* (2006.01)
*G01N 15/14* (2024.01)
(Continued)

(52) U.S. Cl.
CPC .......... *G01N 1/38* (2013.01); *G01N 15/1436* (2013.01); *G01N 35/1097* (2013.01); *G01N 2015/011* (2024.01); *G01N 2035/1032* (2013.01)

(58) Field of Classification Search
CPC .. G01N 1/38; G01N 15/1436; G01N 35/1097; G01N 2015/011; G01N 2035/1032
See application file for complete search history.

(56) References Cited

U.S. PATENT DOCUMENTS

| | | |
|---|---|---|
| 3,567,390 A | 3/1971 | Rothermel |
| 3,712,144 A | 1/1973 | Kuzel et al. |

(Continued)

FOREIGN PATENT DOCUMENTS

| | | |
|---|---|---|
| CN | 105973811 A | 9/2016 |
| CN | 109959549 A * | 7/2019 |

(Continued)

OTHER PUBLICATIONS

Translation of CN109959549 (Year: 2019).*
(Continued)

*Primary Examiner* — Jill A Warden
*Assistant Examiner* — Michael Stanley Gzybowski
(74) *Attorney, Agent, or Firm* — Greer, Burns & Crain, Ltd (57) ABSTRACT

A method for dilution of a blood sample for analysis and to an apparatus for implementation of this method is provided. In the method, an aliquoting device is used, making it possible to carry out a single collection, to form a first dilution in a chamber, to collect a portion of the first dilution in order to form a second dilution in another chamber, to count the blood cells in the first and the second chamber, to carry out a differentiation based on the first dilution, to rinse the first chamber, to form a third dilution based on a quantity of first-dilution liquid remaining in the aliquoting device, then to carry out a differentiation of reticulocytes based on this third dilution.

13 Claims, 5 Drawing Sheets

(51) Int. Cl.
    *G01N 15/1434*    (2024.01)
    *G01N 35/10*      (2006.01)
    *G01N 15/01*      (2024.01)

(56) References Cited

U.S. PATENT DOCUMENTS

| | | | |
|---|---|---|---|
| 4,726,237 | A | 2/1988 | Yung |
| 6,333,197 | B1 | 12/2001 | Le Comte et al. |
| 7,661,326 | B2 | 2/2010 | Li et al. |
| 2016/0361715 | A1* | 12/2016 | Shi .................... A61B 10/0096 |

FOREIGN PATENT DOCUMENTS

| | | | |
|---|---|---|---|
| JP | S4833149 | B1 | 10/1973 |
| JP | H04369461 | A | 12/1992 |
| JP | H04389461 | * | 12/1992 |

OTHER PUBLICATIONS

Translation of JP H04369461 (Year: 1992).*
International Search Report and Written Opinion received for PCT/IB2019/000795, mailed Apr. 8, 2020.
International Preliminary Report on Patentability received for PCT/IB2019/000795, mailed Oct. 8, 2021.

* cited by examiner

DIFFERENTIAL DISPENSING METHOD

BACKGROUND

The present invention relates to a method for dilution of a sample for analysis and to a haematology apparatus for implementation of such a method. This sample may be blood or other biological liquid such as, for example a puncture fluid such as a cerebrospinal fluid (CSF) containing white blood cells or red blood cells.

Generally, a haematology apparatus makes it possible to count and characterize different types of cells present in the blood.

The document U.S. Pat. No. 7,661,326 (Beckman Coulter) is known, describing a haematology apparatus comprising a dispensing valve for segmenting and dispensing several volumes of blood into more than two chambers. This apparatus requires collection of a large quantity of blood to be simultaneously distributed into a number of chambers. Consequently, the fluidics network at the inlet and outlet of the sampling valve is complex and the latter presents risks of clogging due to the circulation of the whole blood in the dispensing valve.

The document U.S. Pat. No. 6,333,197 (ABX) is also known, describing a needle for collecting blood and injecting it into different chambers at the same time as a reagent to produce a homogenous dilution. The system described in this document U.S. Pat. No. 6,333,197 requires collection of a large quantity of whole blood which by design is not totally used. Moreover, the positioning of the needle in the different chambers is complex due to the requirement for the alignment of the needle with the arrival of the reagent. Finally, the chambers are specifically designed in order to allow the homogenization of the blood with the reagent.

An object of the present invention is a novel dispensing method that is rapid and simple to implement.

Another object of the invention is a novel method using a small quantity of whole blood for characterizing the blood cells, for example the white blood cells and the reticulocytes.

SUMMARY

At least one of the above-mentioned objectives is achieved with a method for dilution of a blood sample for analysis, this method comprising the following steps:
a) a single collection of said sample by means of an aliquoting device,
b) injecting said sample into at least one chamber,
c) diluting said sample in this chamber, named first chamber if there are several of them, by means of a dilution reagent to constitute a first-dilution liquid,
d) collecting a portion of the first-dilution liquid by means of the aliquoting device,
e) carrying out at least two other dilutions in order to obtain a second-dilution liquid and a third-dilution liquid, each first- and second-dilution liquid being obtained directly from the first-dilution liquid contained in the aliquoting device, and
f) during steps a) to e) at least one analysis of the first-dilution liquid and/or second-dilution liquid and/or third-dilution liquid.

In the method according to the invention, with a single sample collection, three dilutions are carried out, making it possible to carry out a complete analysis of the sample. This single collection can, for example, be a quantity of 20 µl of whole or diluted blood, whereas in the prior art this collection is generally of the order of 120 µl or more. This method has the advantage of being simple to implement because the retention of the first-dilution liquid in the aliquoting device for the second and the third dilutions is cleverly used.

Moreover, the method according to the invention allows high analysis speeds.

It is understood that the second- and third-dilution liquids are obtained independently of one another, i.e. the third-dilution liquid is not obtained from the second-dilution liquid but directly from the first-dilution liquid retained in the aliquoting device. The dilutions can take place successively in a single chamber or in several chambers.

All or some of the analyses can take place successively or simultaneously (in parallel) depending on the chosen configuration with one chamber or several chambers.

According to an embodiment, the analysis can comprise characterizing the first and/or second and/or third dilution liquid by optical measurement for counting and/or differentiating particles contained in the liquid.

According to an embodiment, the analysis can comprise counting particles in the first- and/or second- and/or third-dilution liquids, by means of a resistive sensor.

The optical measurement can take place on an optical bench or in the chamber used for the dilution, this chamber then being equipped with an optical device.

According to the invention, one or more resistive sensors can be connected to or incorporated in at least one chamber or in an optical bench.

By "optical bench" is meant a device making it possible to:
count the particles by optical means,
characterize the particles by optical means,
count the particles by incorporating one or more resistive sensors therein, and
characterize the particles by optical means enhanced by the information originating from the resistive means.

According to an embodiment of the invention, step e) can comprise the following steps:
e1) injecting into a chamber, preferably into a second chamber a first quantity of the first-dilution liquid contained in the aliquoting device, a second quantity of the first-dilution liquid remaining in the aliquoting device,
e2) diluting the first-dilution liquid contained in the second chamber, by means of a dilution reagent so as to constitute a second-dilution liquid,
e3) injecting a lysis solution into the first chamber to destroy red blood cells,
e4) differentiating white blood cells in the first-dilution liquid contained in the first chamber by optical measurement directly in the first chamber or on an optical bench after transfer of a portion of the first-dilution liquid to this optical bench,
e5) counting the red blood cells and/or the platelets in the second-dilution liquid, preferably in the second chamber, but this can also be done on the optical bench,
e6) counting the white blood cells and/or measuring the haemoglobin in the first-dilution liquid, preferably in the first chamber, but this can also be done on the optical bench,
e7) rinsing at least one chamber,
e8) injecting into the rinsed chamber a portion of the second quantity of the first-dilution liquid still contained in the aliquoting device,
e9) diluting the liquid contained in the rinsed chamber by means of a dilution reagent so as to constitute a third-dilution liquid, e10) analysing the third-dilution liquid.

With only one sample collection, at least one chamber, preferably two chambers, and one optical bench, it is possible to carry out a set of counting and/or differentiation measurements.

With such a method, the analysis speed is very high. By way of example, it is possible to carry out a minimum of 60 tests per hour, one test comprising counting red blood cells, counting white blood cells and differentiating the white blood cells.

According to an advantageous characteristic of the invention, in step e10), it is possible to transfer to the optical bench a portion of the third-dilution liquid for differentiation of the red blood cells, in particular the immature red blood cells, the reticulocytes.

With the method according to the invention, a single sample collection allows differentiation of the white blood cells and differentiation of the red blood cells. In particular, it is possible, for example, to carry out two counts and two differentiations with a single sample collection of 20 μl, one or two chambers and a single optical bench.

According to an advantageous characteristic of the invention, it is possible to use an aliquoting device comprising:
- a needle capable of being moved between a sample collection zone and said at least one chamber,
- a dilution reagent dispenser, and
- a sampling valve comprising at least two liquid pathways and a calibrated-volume channel, a first liquid pathway linking the dispenser to the needle, a second liquid pathway linking the dispenser to the second chamber, and the calibrated-volume channel activating the first liquid pathway or the second liquid pathway.

A sampling valve can be designed comprising two ceramic discs, one of which contains the calibrated-volume channel. This channel can be shifted between two positions, a first position where the channel is comprised within the first liquid pathway and a second position where the channel is comprised within the second liquid pathway.

The invention is in particular remarkable for the re-use of the first dilution present in the needle up to the sampling valve.

In systems of the prior art, there may be a risk of clogging in the valve due to the circulation of the whole blood in the fluidics channels of the valve. In the present invention, this risk is considerably limited because it is the diluted blood that is circulating in the channels of the valve.

Step d) can preferably be carried out by collecting the sample and retaining it inside the needle and in the calibrated-volume channel of the sampling valve. In order to inject the first-dilution liquid into a chamber in order to carry out the second dilution, it is possible to move the calibrated-volume channel containing said first quantity of the first-dilution liquid onto the second liquid pathway, followed by injecting into the first or second chamber via the second liquid pathway, said first quantity being precisely calibrated in the calibrated-volume channel of the sampling valve.

The sampling valve forms part of the fluidics circuit for collecting the first dilution.

It makes it possible to increase speed and avoids polluting the needle, which carries out only a single collection of the starting sample and which subsequently serves solely for collecting, in an embodiment, the first-dilution liquid. In fact the needle makes it possible to collect the first dilution in the first chamber, but injection into the second chamber is carried out directly via the second liquid pathway. More precisely, a tube makes it possible to link the sampling valve to the second chamber. This feature makes it possible, for example, to carry out the second dilution while retaining a portion of the first dilution in the needle, which makes it possible to subsequently dispense a portion of it into the first chamber for the third dilution without being obliged to carry out a new collection of the sample.

According to an embodiment of the invention, step d) can be carried out by collecting the first-dilution liquid and retaining it inside the needle and in the sampling valve. The first-dilution liquid is preferably aspirated into the sampling valve and beyond this valve into a tube between the sampling valve and the dispenser. This embodiment ensures complete filling of the calibrated-volume channel, allowing a precise second dilution because the volume of the calibrated-volume channel is precisely calibrated; the volume injected into the second chamber is thus known exactly.

According to another embodiment of the invention, it is possible to use an aliquoting device comprising one or more sets of precision pistons/syringes in order to collect and inject the sample and the different dilutions from and into the different chambers. The volumes injected in order to carry out the first dilution and the third dilution are determined by precisely controlling the piston(s)/syringe(s).

The steps of the first and second dilutions can preferably be carried out by injecting a reagent of dilution via the aliquoting device. When the aliquoting device comprises a needle and the sampling valve, the two liquid pathways comprise tubes in which the dilution reagent originating from the dilution reagent dispenser serves as liquid for dispensing the sample and/or dilution reagent.

According to a characteristic of the invention, all or some of the dilution steps can be carried out by injecting dilution reagent from a liquid pathway independent of the aliquoting device and directly into the chamber or chambers.

Advantageously, a single optical bench linked to the first chamber can be used.

According to an advantageous characteristic of the invention, all or some of the counts are carried out by means of resistive sensors connected to the first and/or second chamber and/or to other chambers if there are more than two chambers.

By way of example, the first dilution can have a ratio of 1/200, the second dilution can have a ratio of 1/10,000 and the third dilution can have a ratio of 1/10,000.

According to an embodiment of the invention, the injection of the lysis solution in step e3) can be carried out via a liquid pathway independent of the aliquoting device and directly into the first chamber.

This lysis solution has the function of destroying the red blood cells and separating the white blood cells. This also allows stabilization of the haemoglobin in the form of a stable complex.

According to an advantageous characteristic of the invention, the method can comprise a step of adding a fluorescent dye to the first chamber before each optical differentiation measurement. An optical bench making it possible to detect the fluorescence can preferably be used. It is thus possible to detect the reticulocytes, immature red blood cells, thanks to the presence of the fluorescent dye.

In fact it is possible to add a fluorescent dye to the first- and/or second- and/or third-dilution liquid before any optical measurement, so as to improve the differentiation of the blood cells for example the white blood cells or/and the characterization of the reticulocytes using fluorescence.

Advantageously, it is possible to use an independent liquid pathway of the aliquoting device, this liquid pathway being directly connected to the chambers for the rinsing step.

It is also possible to use an independent liquid pathway of the aliquoting device, this liquid pathway being directly connected to the chambers for the dilution step e9). This may be the same liquid pathway as for the rinsing or a different liquid pathway.

According to the invention, steps e5) and e6) can be carried out in parallel or sequentially.

The counts in parallel are carried out using a single aspiration system, allowing aspiration from both chambers into different channels at the same time. It is perfectly possible to envisage separate (non-simultaneous) counts with a single or several distinct aspiration systems.

According to another aspect of the invention, a haematology apparatus for the automatic counting and differentiation of cells in a blood sample is proposed, characterized in that it comprises:
- at least one chamber,
- at least one optical bench linked to at least one chamber,
- an aliquoting device comprising:
  - a needle capable of being moved between a sample collection zone and at least one chamber,
  - a dilution reagent dispenser, and
  - a sampling valve comprising at least two liquid pathways and a calibrated-volume channel, a first liquid pathway linking the dispenser to the needle, a second liquid pathway linking the dispenser to at least one chamber, and the calibrated-volume channel activating the first liquid pathway or the second liquid pathway.

A treatment unit for implementing the different steps and controlling the different components is also provided.

The sampling valve according to the invention can contain a calibrated-volume channel, this calibrated-volume channel being capable of constituting either a part of the first liquid pathway or a part of the second. In other words, the calibrated-volume channel switches over from one liquid pathway to the other. When it is on the first liquid pathway, the dispenser can control the aspiration or the expulsion of a portion of the liquid contained in the first liquid pathway, the second liquid pathway being non-operational. When it is on the second liquid pathway, the dispenser can control the expulsion of a portion of the liquid contained in the second liquid pathway, the first liquid pathway then being non-operational.

BRIEF DESCRIPTION OF THE DRAWINGS

Other advantages and characteristics of the invention will become apparent on examining the detailed description of an embodiment, which is in no way limitative, and the attached drawings, in which.

DETAILED DESCRIPTION

The embodiments which will be described below are in no way limitative; in particular, variants of the invention comprising only a selection of characteristics described below in isolation from the other characteristics described can be implemented, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described are provided to be combined with each other in any combination where there is no objection to this from a technical point of view.

In the figures, the elements common to several figures retain the same reference number.

Figure 1:
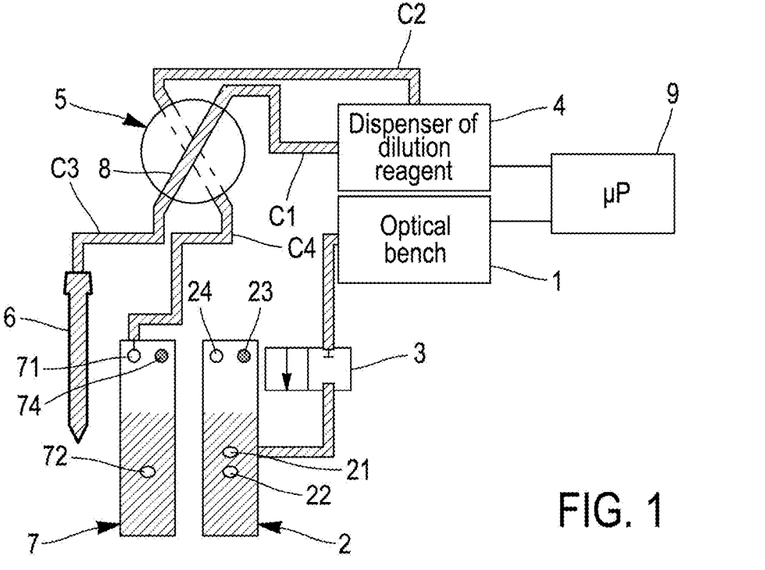
FIG. 1 is a diagrammatic view illustrating a few components constituting an automatic haematology analyser that is ready for use.

FIG. 1 illustrates components constituting an automatic haematology analyser that is ready for use, awaiting an analysis cycle.

An optical bench 1 for characterizing different types of cells present in the blood can be seen. A first chamber 2 is linked to the optical bench 1 via a solenoid valve 3 capable of blocking or allowing the passage of fluid contained in the first chamber 2 to the optical bench 1. The first chamber 2 comprises an outlet 21 connecting to the solenoid 3, and electronic means, in particular at least one sensor 22, for resistivity measurements. These measurements are, for example, implemented during cell counts.

For the sake of clarity of the diagram, only the optical bench 1 is shown; it is clear that a flow cell (not shown) is provided within this optical bench, in which the fluid to be characterized can flow.

A dilution reagent dispenser 4 can also be seen, linked to a sampling valve 5 via two parallel conduits C1 and C2. The sampling valve 5 is linked on one side to a needle 6 via a conduit C3 and on the other side to a second chamber 7 via a conduit C4.

The sampling valve 5 is a valve comprising two liquid pathways and a calibrated-volume channel 8. The first liquid pathway makes it possible to link the conduits C1 and C3 via the calibrated-volume channel 8. The second liquid pathway makes it possible to link the conduits C2 and C4 via the calibrated-volume channel 8. This calibrated-volume channel can thus form part of the first liquid pathway or of the second liquid pathway but not both at the same time. Advantageously, this calibrated-volume channel 8 is a conduit suitable for switching from one liquid pathway to the other and forms a reservoir of fluid, the volume of which is very precisely predetermined. A predetermined quantity of liquid can thus be sent from one liquid pathway to the other.

The conduit C4 is connected to the second chamber 7 via an inlet 71.

This second chamber 7 also comprises electronic means, in particular at least one sensor 72, for resistivity measurements. These measurements are, for example, implemented during cell counts. An independent liquid pathway 74 can also be provided for injecting dilution reagent.

A treatment unit 9 capable of controlling the different components can also be seen.

In FIG. 1, the needle 6, the first and second liquid pathways, the calibrated-volume channel 8 as well as the chambers are filled with clean dilution reagent. The machine is ready to be used.

Figure 2:
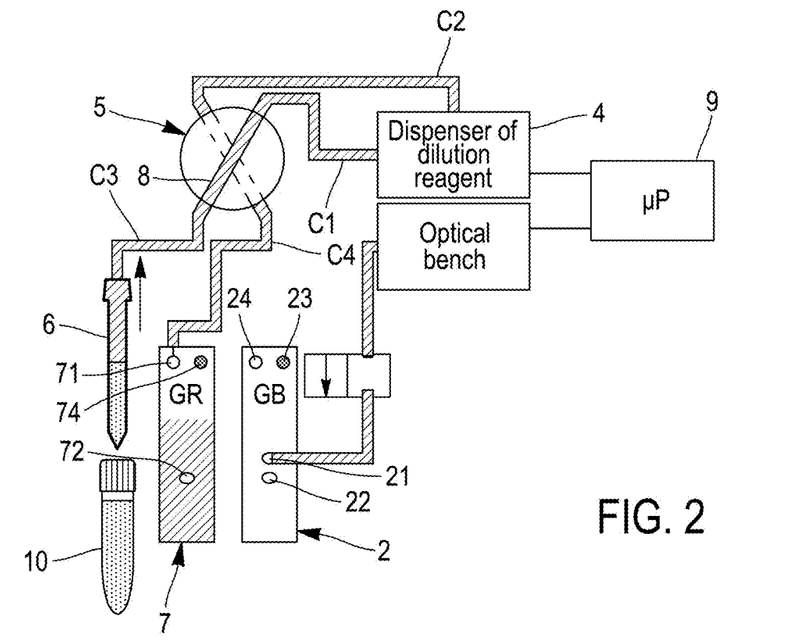
FIG. 2 is a diagrammatic view illustrating a preliminary step of whole blood collection.

In the preliminary step in FIG. 2, blood is collected in the needle 6 from a tube of whole blood 10. A certain volume of blood is then situated only in a part of the needle. The first liquid pathway comprising the conduits C1 and C3 is mainly filled with dilution reagent, except for the part of the needle 6 containing blood. It is via an aspiration function via the dilution reagent dispenser that the needle collects the blood.

At the same time, the first chamber 2 is emptied.

Figure 3:
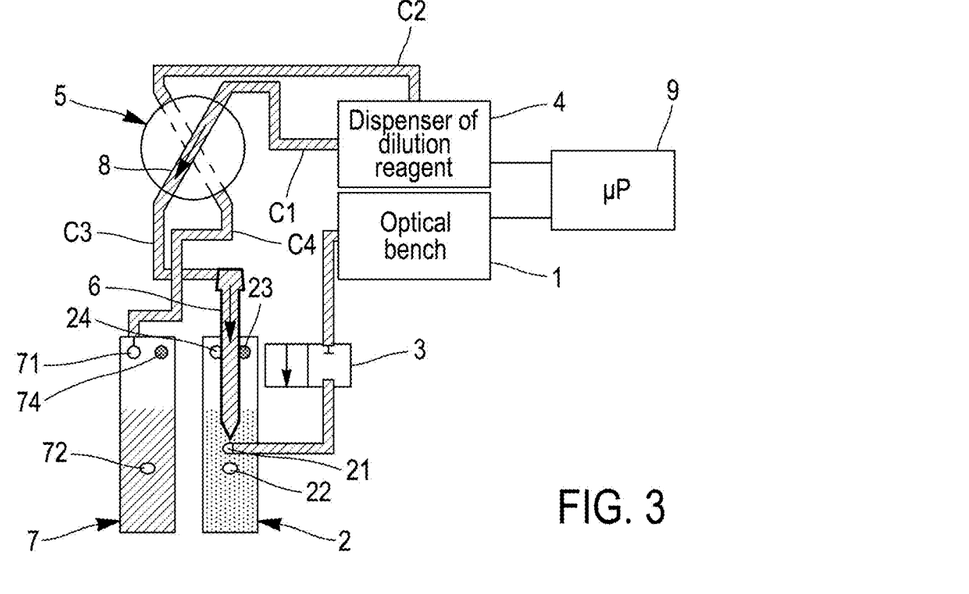
FIG. 3 is a diagrammatic view illustrating a step 1 of constituting a first dilution.

In step 1, in FIG. 3, the needle 6 is moved as far as into the first chamber 2 so as to inject all of the collected blood into it. And the injection is continued so as to fill up with the dilution reagent contained in the first liquid pathway and delivered via the dispenser. The mixture of the blood thus deposited with a volume of dilution reagent much greater than the volume of collected blood constitutes the first-dilution liquid with a ratio, for example, of one volume of blood to two hundred volumes of dilution reagent.

Figure 4:
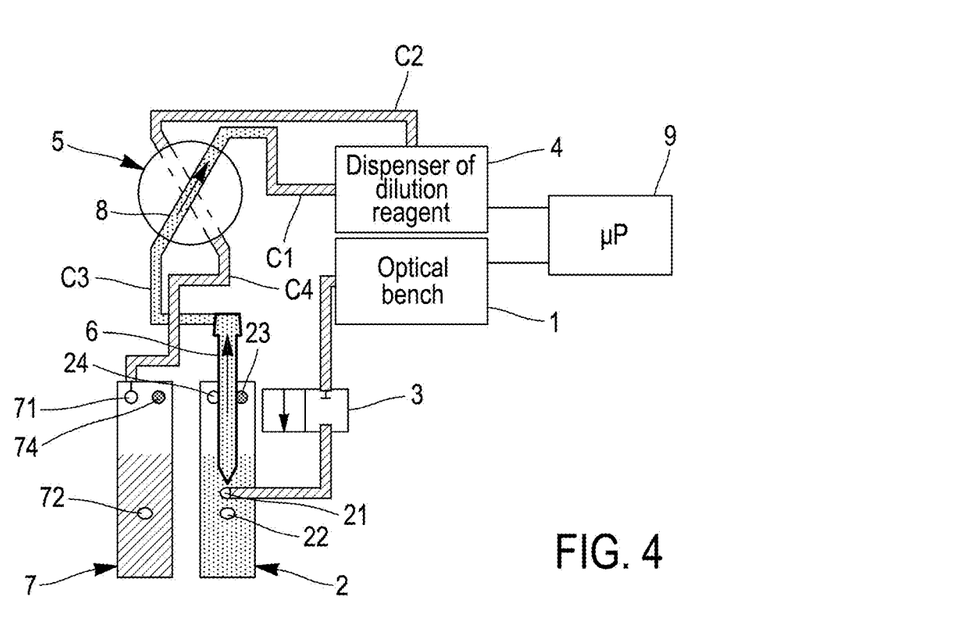
FIG. 4 is a diagrammatic view illustrating a step 2 of collecting a portion of the first dilution.

In step 2, in FIG. 4, a portion of the first dilution is collected from the first chamber 2 as far as into a part of the conduit C1. Consequently, the needle 6, the conduit C3 and the sampling valve, in particular the calibrated-volume channel 8, are completely filled with the first-dilution liquid.

Figure 5:
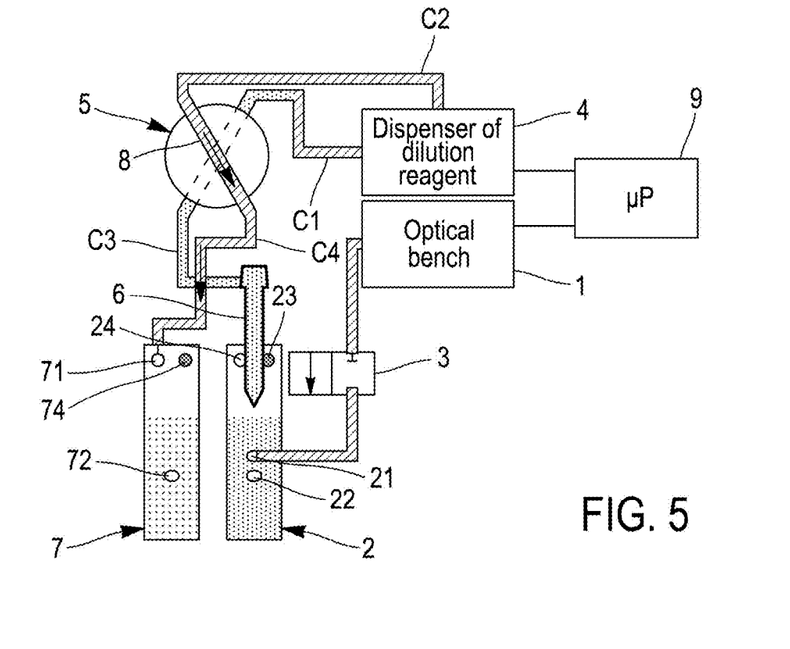
FIG. 5 is a diagrammatic view illustrating a step 3 of constituting a second dilution.

In step 3, in FIG. 5, the calibrated-volume channel 8 filled with first-dilution liquid is switched from the first liquid pathway to the second liquid pathway; the latter is now operational. The fact of having aspirated in the step 2 the first-dilution liquid as far as into a part of the conduit C1 made it possible to completely fill the calibrated-volume channel 8.

Then, the liquid contained in the second liquid pathway is pushed so as to inject the quantity contained in the calibrated-volume channel 8 as well as a large portion of dilution reagent into the second chamber 7 via the inlet 71 and the conduit C4. A second-dilution liquid is thus formed with a ratio, for example, of one volume of clean blood to ten thousand volumes of dilution reagent.

In the first chamber, once the desired portion of the first-dilution liquid has been collected, the needle 6 is raised again so that it does not remain in contact with the liquid in the first chamber 2 and the lysis solution is injected into this first chamber 2 via an inlet 23. The lysis solution has the function of destroying the red blood cells.

At this stage, it is noted that the first-dilution liquid remains present in the needle 6 and in a part of the first liquid pathway comprising the conduit C1 and the conduit C3.

Figure 6:
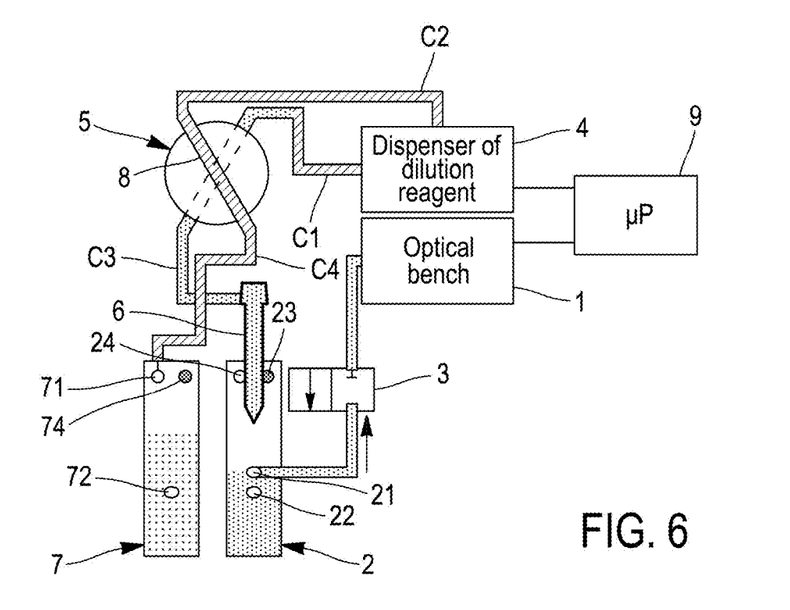
FIG. 6 is a diagrammatic view illustrating a step 4 of transfer to an optical bench for a differentiation of white blood cells.

In step 4 in FIG. 6, the solution is transferred from the first chamber 2 to the optical bench for differentiation of the populations of the white blood cells. In parallel, or separately, the white blood cells are counted in the first chamber 2 by measuring resistivity and a haemoglobin measurement is carried out by means of a spectrophotometer (not shown).

In the second chamber 7, the red blood cells and platelets are counted by measuring resistivity. The counting in the second chamber 7 can be carried out simultaneously with the counting in the first chamber. This is particularly the case when a single aspiration system (not shown) is used for both chambers during the counting process. In fact, the counting sequence requires to aspirate, by means of the generation of a vacuum, the liquid contained in the chamber through a calibrated orifice based on the impedance measurement principle.

Figure 7:
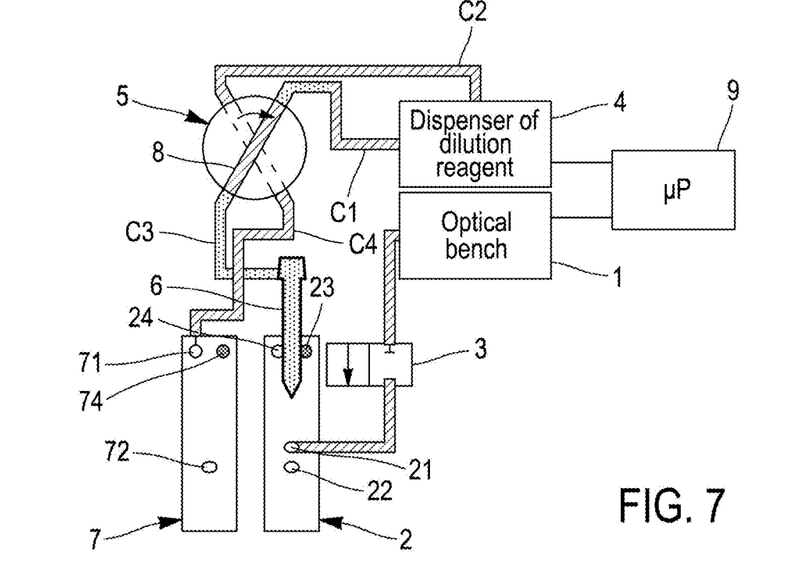
FIG. 7 is a diagrammatic view illustrating a step 5 of emptying and rinsing the chambers.

In step 5 in FIG. 7, the two chambers are rinsed and emptied completely, as is the fluid circuit between the first chamber 2 and the optical bench 1. It is possible to use the dilution reagent for rinsing the chamber, in order to send it in the fluid circuit to the optical bench and thus to rinse and refill this circuit. The calibrated-volume channel 8, filled with dilution reagent, is then switched to the first liquid pathway.

Figure 8:
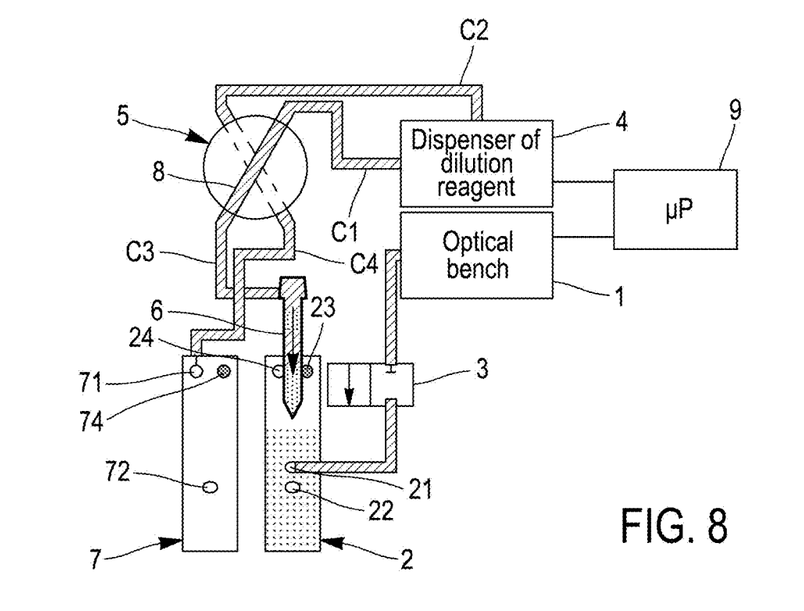
FIG. 8 is a diagrammatic view illustrating a step 7 of constituting a third dilution.

In step 7 in FIG. 8, a third dilution is carried out according to the invention. In order to do this, a quantity of first-dilution liquid still present in the needle 6 is injected into the first chamber 2. A specific volume is pushed. At the end of this step, a residual first-dilution volume can still be present in the needle 6. The dilution is carried out by injecting dilution reagent via an inlet 24 of the first chamber 2. The supply circuit of this inlet 24 from the dispenser 4 is not shown. A fluorescent dye can also be added.

Figure 9:
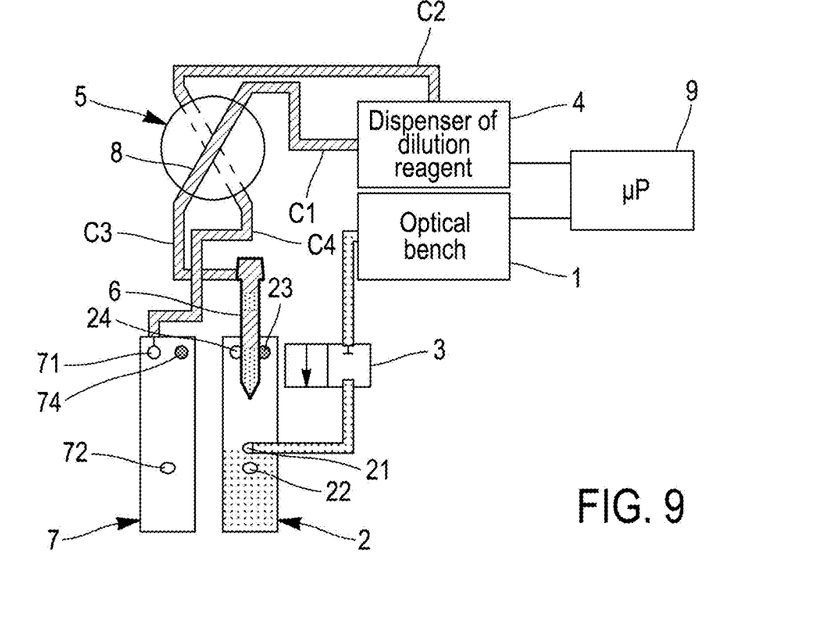
FIG. 9 is a diagrammatic view illustrating a step 8 of transfer to the optical bench for a differentiation of red blood cells.

In step 8 in FIG. 9, the solution is transferred from the first chamber 2 to the optical bench 1; then the differentiation of the red blood cells and the reticulocytes is carried out.

Figure 10:
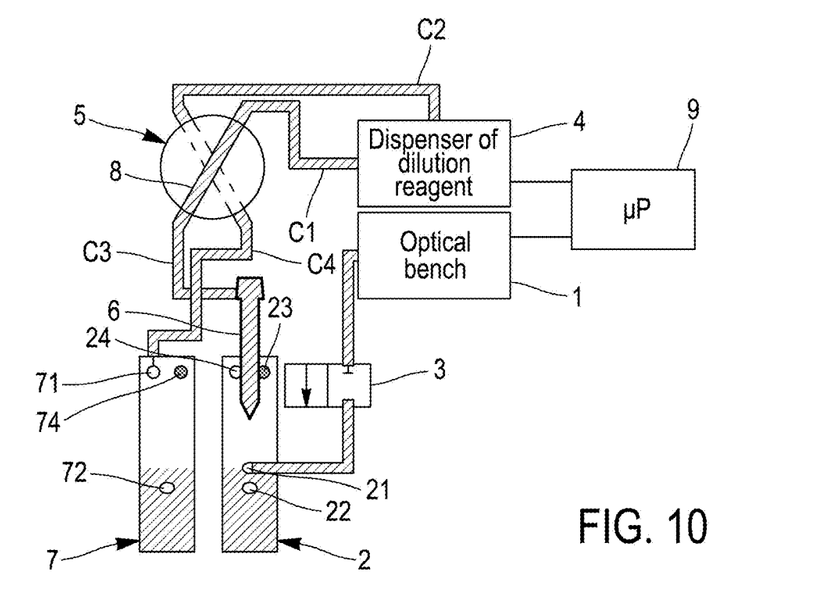
FIG. 10 is a diagrammatic view illustrating a step 9 of emptying and final rinsing.

In step 9 in FIG. 10, when the differentiation is completed, the needle 6 is emptied of residual blood. The chambers are rinsed then refilled with dilution reagent, awaiting a subsequent analysis.

The invention thus makes it possible to perform several differentiation measurements based on a single collection, cleverly using an aliquoting device that allows a first-dilution liquid and the dilution reagent to be segmented.

The present invention thus relates to a method for dilution of a blood sample for analysis and to an apparatus for implementation of such a method.

In the method, an aliquoting device is used, making it possible to carry out a single collection, to form a first dilution in a chamber, to collect a portion of the first dilution in order to form a second dilution in another chamber, to count the blood cells in the first and the second chamber, to carry out a differentiation based on the first dilution, to rinse the first chamber, to form a third dilution starting from a quantity of first-dilution liquid remaining in the aliquoting device, then to carry out a differentiation of reticulocytes based on this third dilution.

Of course, the invention is not limited to the examples which have just been described, and numerous adjustments can be made to these examples without exceeding the scope of the invention.

The invention claimed is:

1. A method for dilution of a blood sample for analysis, the method comprising the following steps:
   a) a single collection of said sample by means of an aliquoting device;
   b) injecting said sample into a first chamber;
   c) diluting said sample in the first chamber by means of a dilution reagent so as to constitute a first-dilution liquid;
   d) collecting a portion of the first-dilution liquid by means of the aliquoting device; e) carrying out at least two other dilutions in order to obtain a second-dilution liquid and a third-dilution liquid, each of the second— and third—dilution liquids being obtained directly from the first-dilution liquid contained in the aliquoting device; and
   f) during steps a) to e) at least one analysis is performed on the first-dilution liquid and/or second-dilution liquid and/or third-dilution liquid, wherein the aliquoting device further comprises:
  a needle capable of being moved between a sample collection zone and at least the first chamber and a second chamber,
  a dilution reagent dispenser, and
  a sampling valve comprising at least two liquid pathways and a calibrated-volume channel, a first liquid pathway linking the dispenser to the needle, a second liquid pathway linking the dispenser to the second chamber, and the calibrated-volume channel completing the first liquid pathway or the second liquid pathway, and
wherein the step d) is carried out by collecting the first-dilution liquid and retaining it inside the needle and in the calibrated-volume channel of the sampling valve, and in that, in order to inject the first-dilution liquid into a chamber in order to carry out the second dilution, the calibrated-volume channel containing a first quantity of the first-dilution liquid is switched from the first liquid pathway to the second liquid pathway, followed by injecting said first quantity of said first-dilution liquid into the second chamber via the second liquid pathway, said first quantity being precisely calibrated in the calibrated-volume channel of the sampling valve; the third-dilution liquid being obtained directly from the first-dilution liquid contained in the needle.

2. The method according to claim 1, wherein the analysis comprises characterizing the first and/or second and/or third dilution liquid by optical measurement for counting and/or differentiating particles contained in the liquid.

3. The method according to claim 1, wherein the analysis comprises counting particles of the first—and/or second—and/or third—dilution liquids, by means of a resistive sensor.

4. The method according to claim 1, wherein the analysis comprises characterizing the third-dilution liquid by optical measurement for counting and/or differentiating particles contained in the liquid.

5. The method according to claim 1, wherein the steps of the first and second dilutions are carried out by injecting dilution reagent via the aliquoting device.

6. The method according to claim 1, wherein all or some of the dilution steps are carried out by injecting dilution reagent from a liquid pathway independent of the aliquoting device and directly into the first chamber and/or the second chamber.

7. The method according to claim 1, wherein a single optical bench linked to the first chamber is used for differentiating white blood cells in the first-dilution liquid contained in the first chamber by optical measurement directly in the first chamber or on an optical bench after transfer of a portion of the first-dilution liquid to the optical bench.

8. The method according to claim 1, wherein the first dilution has a ratio of 1/200, the second dilution has a ratio of 1/10,000 and the third dilution has a ratio of 1/10,000.

9. The method according to claim 1, wherein an analysis is carried out using an epifluorescence optical bench.

10. The method according to claim 1, wherein step e) comprises the following steps:
  e1) injecting into the second chamber a first quantity of the first-dilution liquid contained in the aliquoting device, a second quantity of the first-dilution liquid remaining in the aliquoting device;
  e2) diluting the first-dilution liquid contained in the second chamber, by means of a dilution reagent to constitute a second-dilution liquid;
  e3) injecting a lysis solution into the first chamber to destroy red blood cells;
  e4) differentiating white blood cells in the first-dilution liquid contained in the first chamber by optical measurement directly in the first chamber or on an optical bench after transfer of a portion of the first-dilution liquid to this optical bench;
  e5) counting the red blood cells and/or platelets in the second-dilution liquid (preferably in the second chamber or on the optical bench);
  e6) counting the white blood cells and/or measuring the haemoglobin in the first-dilution liquid (preferably in the first chamber or on the optical bench);
  e7) rinsing at least one chamber;
  e8) injecting into the rinsed chamber a portion of the second quantity of the first-dilution liquid still contained in the aliquoting device;
  e9) diluting the liquid contained in the rinsed chamber, by means of a dilution reagent so as to constitute a third-dilution liquid; and
  e10) analysing the third-dilution liquid.

11. The method according to claim 10, wherein in step e10) a portion of the third-dilution liquid is transferred to the optical bench for differentiation of the reticulocytes.

12. A haematology apparatus for the automatic counting and differentiation of cells in a blood sample, comprising:
  at least one chamber;
  at least one optical bench linked to at least one chamber;
  an aliquoting device comprising:
  a needle configured for being moved between a sample collection zone and at least one chamber;
  a dilution reagent dispenser;
  wherein the apparatus further comprises:
  a sampling valve comprising at least two liquid pathways and a calibrated-volume channel, a first liquid pathway linking the dilution reagent dispenser to the needle, a second liquid pathway linking the dilution reagent dispenser to at least one chamber, and the calibrated-volume channel completing the first liquid pathway or the second liquid pathway.

13. The apparatus according to claim 12, wherein the calibrated-volume channel contains a calibrated-volume duct, and in that this calibrated-volume channel I is configured for completing one of a part of the first liquid pathway and a part of the second liquid pathway.

* * * * *